Aug. 27, 1929.  H. PRIGGE  1,725,882

PUNCTUREPROOF RESILIENT INSERT FOR TIRES

Filed April 17, 1926

INVENTOR,
BY
ATTORNEY.

Patented Aug. 27, 1929.

1,725,882

UNITED STATES PATENT OFFICE.

HENRY PRIGGE, OF NEW YORK, N. Y., ASSIGNOR OF THREE-FOURTHS TO DORA HECHT, OF YONKERS, NEW YORK.

PUNCTUREPROOF RESILIENT INSERT FOR TIRES.

Application filed April 17, 1926. Serial No. 102,606.

This invention relates to puncture-proof resilient inserts for tire shoes of automobiles and the like.

Pursuant to my invention, the insert comprises spirally arranged laminations of "live" rubber, formed by winding or rolling a sheet of "live" rubber upon itself while applying a predetermined tension of the sheet substantially uniformly in the winding operation and a layer of suitable material is interposed between the spirally arranged laminations to afford movement between the laminations relatively to one another. The outermost layer or lamination of "live" rubber is secured in position to the immediately inwardly disposed laminations as by vulcanization or by means of an adhesive or by other suitable procedure.

In use, the insert is disposed within a shoe such as a regulation type of shoe in present day use. Preferably, a closed covering of rubber or other suitable material is provided for the insert, the cover being formed with a projection to be disposed between the beads of the tire shoe. Such cover may be formed of a layer of rubber, the ends of which are secured to one another by cement or the like.

The interposed material is of such nature as to provide a film between the successive laminations in the formation of the spiral which effects a partial adherence between the successive laminations to thereby facilitate the winding of the sheet in laminations of a uniform predetermined tension, as hereinabove set forth. The interposed material serves also in the completed insert when in use within a tire shoe on a vehicle as a lubricant to afford a restricted movement between immediately succeeding laminations to effect the nature of buoyancy to the vehicle comparable to pneumatic inflation and to absorb shocks, when striking a car track or stone, or when encountering depressions or passing over irregularities in the roadway and the like.

Further features and objects of the invention will be more fully understood from the following detail description and the accompanying drawings, in which Fig. 1 is a cross-sectional elevation of a preferred form of insert embodying my invention;

Figure 1:
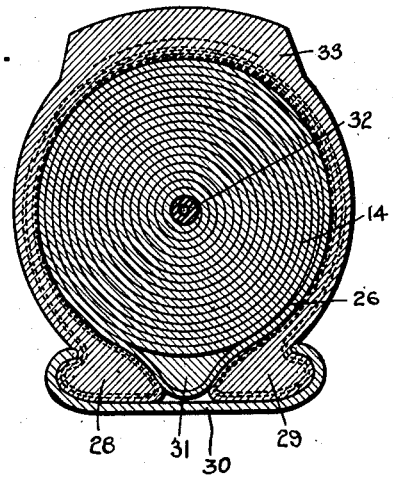
Figure 3:
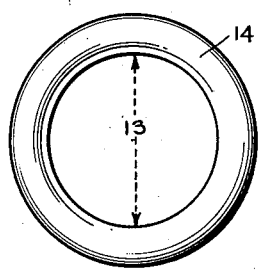
Fig. 3 is a top plan view, on a scale, substantially that of Fig. 2, of an insert resulting from the winding operation indicated in Fig. 2.
Figure 4:
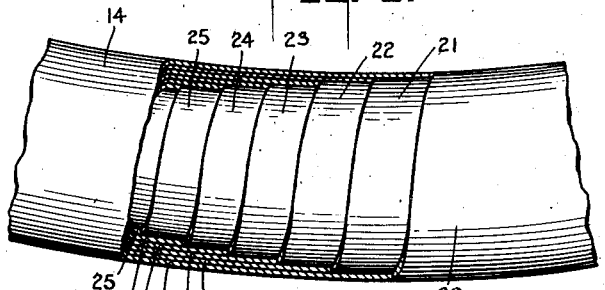
Figure 5:
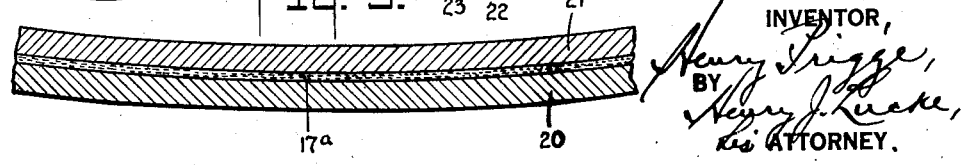

Fig. 4 is a detail side elevation, partly in successive planes of cross section, of my insert, and illustrating the disposition of the sucessive spirals; the scale of Fig. 4 is somewhat larger than that of Fig. 3 and less than that of Fig. 1; and Fig. 5 is a detail sectional view on a greatly enlarged scale, showing two immediately adjacent laminations and a layer of interposed material, the thickness of the latter being greatly exaggerated.

Figure 2:
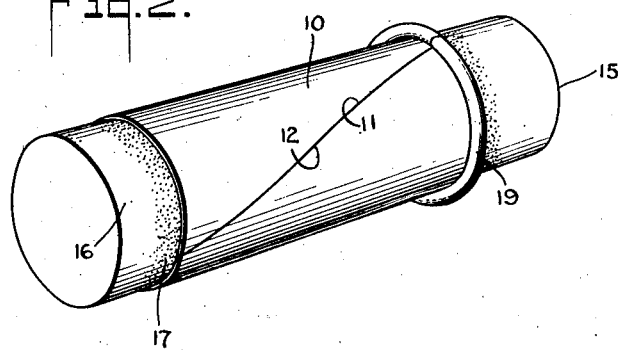
Fig. 2 is a diagrammatic view, in perspective, on a reduced scale, showing the step preliminary to the winding operation in the manufacture of inserts in accordance with my invention.

Pursuant to a preferred form of my invention, referring to Fig. 2, a sheet 10 of "live" rubber is cut of the dimension extending from the edge 11 to the opposite edge 12 of the proper length corresponding to the inner diameter indicated at 13, see Fig. 3, of the resulting laminated insert 14. Accordingly, the diameter of the winding drum 15, see Fig. 2 is that of the inner diameter 13 of the insert 14.

Upon the periphery 16 of the winding drum 15, I apply a layer 17 of the interposed material. Preferably, the interposed material is an admixture of uncured rubber, with a vehicle such as gasoline or benzol or the like and an ingredient such as raw linseed oil, or turpentine, or glycerine or the like for maintaining the admixture plastic and "wet", and preferably to afford the limited degree of "lubrication" between the spiral laminations.

The rubber content of such interposed material is in a form to preclude curing or vulcanization by action of heat or heat and pressure arising in the use of the insert within a tire shoe. The layer 17 is allowed to "dry" for but a short period, whereby but a portion of its vaporizable ingredient vaporizes, leaving a continuous film of uncured and uncurable rubber in "wet" or fluid state.

As is indicated in Fig. 2, I prefer to cut edges 11, 12 on a bias, that is to say, at substantially equal angles to the respective opposite edges of the sheet 10, whereby the edges 11, 12, are held on the winding drum 15 by the partially dried interposed material 17 in immediate abutting or flush relation to one another and whereby the line of junction of these edges 11, 12, extend spirally relatively to the axis of the winding drum 15.

Having applied the sheet 10 on the winding drum 15 as above stated, the formation of the laminations is had by beginning at either of the opposite edges, say the right-hand edge indicated in Fig. 2, and applying a pressure to roll the sheet 10 upon itself as is indicated at 19. Such rolling pressure is applied preferably uniformly about the winding drum 15 and the degree of the pressure thus applied determines the degree of tautness of each convolution thus formed, and determines the degree of "life" of the resulting insert. Such winding pressure is continued, resulting in the formation of one convolution upon the other and in a series or spiral of laminations forming the resulting annulus 14.

By locating the edges 11, 12 at an angle to the axis of the winding drum, the junction line 11, 12 is distributed in the formed laminations at locations displaced circumeferentially relative to one another within the laminations of the annulus.

The material applied to the drum and the under face of the sheet 10 in its initial position upon the drum adheres to such face as the winding progresses, thus facilitating the operation of forming the laminations with substantially uniform tautness as desired.

The insert annulus resulting from the procedure shown in Fig. 2 is indicated in Fig. 3. The outer diameter of the insert annulus is determined by the dimension of the sheet 10 between its opposite edges and the tension of the rolling pressure.

The next stage of my procedure is that of anchoring the outermost laminations by vulcanizing the outer edge portion of the same to the immediately inward lamination, the vulcanizing being carried out solely at its outer edge portion to thereby retain the independence of the remaining laminations of one another and thereby precluding any solidification of the inner laminations to one another.

Fig. 4 indicates the spiral structure of the laminations thus formed, the outermost lamination being indicated at 20, the next lamination at 21, the next at 22, the next at 23, the next at 24, the next at 25, etc., as will now be apparent.

By the procedure above set forth, the insert is formed of convolutions of "live" rubber related spirally to one another and by reason of the winding operation in forming the insert, the interposed material 17ª, see Fig. 5, as between any convolution 20 and its next convolution 21, which material embodies uncured and uncurable rubber in fluid state, is spread out spirally as a film and interposed between the successive convolutions. The fluid state of the interposed material is maintained continuously during the life of the insert upon the sealing of the outermost convolution, as above set forth, and also by reason of the insert being of endless formation.

Preferably, I provide my annulus insert 14 with an outer envelope 26, also preferably of live rubber, formed of a sheeting wrapped thereon and vulcanized at its ends.

The annulus insert of the simple form shown in Fig. 4, with or without such envelope 26, is applicable for use as an insert for bicycle tires. However, for use in shoes of automobiles, motor cycles and the like, usually comprising the spaced beads 28, 29, which are received within the rim 30 of the vehicle wheel, I prefer to form the envelope 26 with the extension 31 extending radially at the inner circumferential periphery of the annulus 14 and projecting sufficiently to be received between the beads 28, 29, when installed in position.

For tires of larger outer diameters, a correspondingly longer sheet 10 is employed in the winding operation. For tires of different inner diameters, are employed winding drums of diameters corresponding respectively to the inner diameters of the tires.

As indicated above, the degree of resiliency and corresponding rigidity of the annular insert is regulated by the degree of rolling pressure applied to the laminations.

By the procedure of winding as above described, the annular insert is formed endlessly with respect to the individual laminations which respectively extend circularly about the axis of curvature of the inner and outer diameters of the annulus, whereby compression of the insert enclosed in a tire shoe is taken up by the material of the portions of the laminations proximate the ground without danger of rupture or permanent deformation of the insert material.

If desired, an endless core of rubber 32 may be employed to serve as the core of the spiral laminations. Such core 32 may be of solid "live" rubber, but is preferably hollow at its center and of a diameter as desired as a factor of regulating the resiliency of the resulting insert. Such core 32 also serves to facilitate the winding or rolling of the sheet 10 in the operation performed on the drum 15 in forming the spiral laminations 20 to 25, and the inwardly succeeding laminations.

My invention is advantageous in that it is directly applicable to the present day tire shoe construction for the wheels of automobiles and other vehicles, motor cycles, bicycles and the like.

The fluid state of the material interposed between the spiral laminations of my insert serves as a "lubricating" medium between the spiral laminations in the use of the insert, the range of relative displacement between the laminations being restricted by the resiliency of the individual laminations respectively imposed in the winding operation as above described and maintained by the "anchoring" of the outermost lamination. Such "lubrication" effects a resiliency in the use of my insert in a tire shoe 33, see Fig. 1, of the nature of pneumatic inflation and of the ranges of "pressure" corresponding to the present day practice, namely, the pressure range for cord tires of from approximately 55 to 70 pounds air pressure, and for the pressure range for balloon and semi-balloon tires of from approximately 25 to 35 pounds air pressure, and similarly for other commercial ranges of air pressure.

In use, the interposed material 17$^a$ of my insert effects substantially the total absence of any heating which might otherwise be engendered by the displacement of the respective laminations relative to one another. The interposed material 17$^a$ serves also, in the event of a nail or the like entering through the body of the tire shoe, of automatically sealing any clearance between the nail and the laminations, and likewise upon withdrawing the nail or the like from the tire or shoe.

An especial advantage in the use of my invention is that the tires and the contained inserts do not require any checking up of "pressure", which is necessary for types of pneumatically inflated tubes, whether punctureproof or not, and that the "pressures" of the inserts of all four tires on any vehicle are always uniform, thereby, at all times yielding the maximum comfort to the occupants of the vehicle.

Whereas, I have described my invention by reference to specific forms thereof, it will be understood that many changes and modifications may be made without departing from the spirit of the invention as defined by the appended claims.

I claim:—

1. A resilient insert for vehicle tires comprising an endless annulus of substantially circular cross-section formed of convolutions of resilient material wound upon itself spirally about the axis of the circular cross-section, each convolution extending peripherally about the annulus; and a material containing uncured and uncurable rubber in fluid state interposed between adjacent convolutions.

2. A resilient insert for vehicle tires comprising an endless annulus of substantially circular cross-section formed of convolutions of resilient material wound upon itself spirally about the axis of the circular cross-section, each convolution extending peripherally about annulus; and a material containing rubber and an ingredient for maintainng said rubber while sealed from the air in fluid state interposed between adjacent convolutions.

In testimony whereof I have signed this specification this 10th day of April, 1926.

HENRY PRIGGE.